US012563354B2

(12) United States Patent
Phan et al.

(10) Patent No.: US 12,563,354 B2
(45) Date of Patent: Feb. 24, 2026

(54) HEARING INSTRUMENT HOUSING WITH A BATTERY DOOR HAVING AN INTEGRATED AUDIO CHANNEL

(71) Applicant: Starkey Laboratories, Inc., Eden Prairie, MN (US)

(72) Inventors: Toan Huy Phan, Shakopee, MN (US); Ganesh Borra, Plymouth, MN (US); Chandrakanth Barad, Tamaulipas (MX)

(73) Assignee: Starkey Laboratories, Inc., Eden Prairie, MN (US)

( * ) Notice: Subject to any disclaimer, the term of this patent is extended or adjusted under 35 U.S.C. 154(b) by 151 days.

(21) Appl. No.: 18/419,119

(22) Filed: Jan. 22, 2024

(65) Prior Publication Data

US 2024/0251211 A1 Jul. 25, 2024

Related U.S. Application Data

(60) Provisional application No. 63/481,091, filed on Jan. 23, 2023.

(51) Int. Cl.
*H04R 25/00* (2006.01)

(52) U.S. Cl.
CPC ....... *H04R 25/602* (2013.01); *H04R 2460/13* (2013.01)

(58) Field of Classification Search
CPC .......................... H04R 25/602; H04R 2460/13
See application file for complete search history.

(56) References Cited

U.S. PATENT DOCUMENTS

| | | | | |
|---|---|---|---|---|
| 6,985,598 B1 * | 1/2006 | Joschika | .............. | H04R 25/556 381/322 |
| 7,024,012 B2 | 4/2006 | Olsen | | |
| 7,832,080 B2 | 11/2010 | Killion et al. | | |
| 2007/0286442 A1 * | 12/2007 | Hessel | ................. | H04R 25/609 381/322 |
| 2015/0289068 A1 * | 10/2015 | Sundberg | ............. | H04R 25/603 381/323 |
| 2017/0105077 A1 * | 4/2017 | Rasmussen | ............ | H04R 25/65 |

FOREIGN PATENT DOCUMENTS

EP 3151586 A1 4/2017

* cited by examiner

*Primary Examiner* — Suhan Ni
(74) *Attorney, Agent, or Firm* — Shumaker & Sieffert, P.A.

(57) ABSTRACT

A hearing instrument and the techniques of operating the hearing instrument to improve audio reception while lowering the risk of foreign material ingress. The hearing instrument includes a microphone, and a housing that defines a cavity containing the microphone. The housing includes a battery door defining a first portion of an audio channel, the first portion of the audio channel having a first entrance on an exterior surface of the battery door, the first portion of the audio channel having a first exit on an internal surface of the battery door. The housing further includes a housing element defining a second portion of the audio channel, the second portion of the audio channel having a second entrance aligned with the first exit, the second portion of the audio channel terminating in the cavity containing the microphone.

9 Claims, 3 Drawing Sheets

HEARING INSTRUMENT HOUSING WITH A BATTERY DOOR HAVING AN INTEGRATED AUDIO CHANNEL

This application claims the benefit of U.S. Provisional Patent Application No. 63/481,091, filed 23 Jan. 2023, the entire contents of which is incorporated herein by reference.

TECHNICAL FIELD

This disclosure relates to housings of hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and other hearing devices configured to generated audio signals. Some hearing instruments use disposable batteries that may be changed on a regular basis. Some hearing instruments with disposable batteries include a battery door for ease of battery replacement.

SUMMARY

Hearing instruments may be used to improve a user's ability to hear sounds or acoustic signals not perceptible he the user's diminished hearing sensitivity. In some examples, a hearing instrument may receive an audio signal, processing the audio signal into an electrical signal, and use the electrical signal to produce a second audio signal for the user. The electronics of a hearing instrument may be packaged in a housing that protects the electronics from degradation from foreign materials. The processing electronics may be configured to process audio signals when worn on or in the ear of a user, and therefore may be exposed to a variety of human tissue over time. The hearing instrument, and its components, may be configured, in accordance with one or more techniques of this disclosure, to process audio sounds or signals received by the hearing instrument into processed audio sounds that may be played for the user. The reception, processing, and playing of audio sounds by the hearing instrument may be performed continuously, over the life of the battery or charge, when placed in the ear of the user. While in the ear of the user, the hearing instrument may also be configured to inhibit the ingress of foreign material such as ear wax, hair, or other human tissue into one or more channels or openings of the hearing instrument.

In some examples, a hearing instrument may include: a microphone; and a housing that defines a cavity containing the microphone, the housing comprising: a battery door defining a first portion of an audio channel, the first portion of the audio channel having a first entrance on an exterior surface of the battery door, the first portion of the audio channel having a first exit on an internal surface of the battery door; and a housing element defining a second portion of the audio channel, the second portion of the audio channel having a second entrance aligned with the first exit, the second portion of the audio channel terminating in the cavity containing the microphone.

In some examples, various techniques of receiving audio with a hearing instrument may include: receiving audio signals, with a microphone, an auditory sound from a housing; transducing the auditory sound to the microphone, using the housing comprising: a battery door defining a first portion of an audio channel, the first portion of the audio channel, the first portion of the audio channel having a first entrance on an exterior surface of the battery door, the first portion of the audio channel having a first exit on an internal surface of the battery door; and a housing element defining a second portion of the audio channel, the second portion of the audio channel having a second entrance aligned with the first exit, the second portion of the audio channel terminating in the cavity containing the microphone.

DETAILED DESCRIPTION

Figure 1:
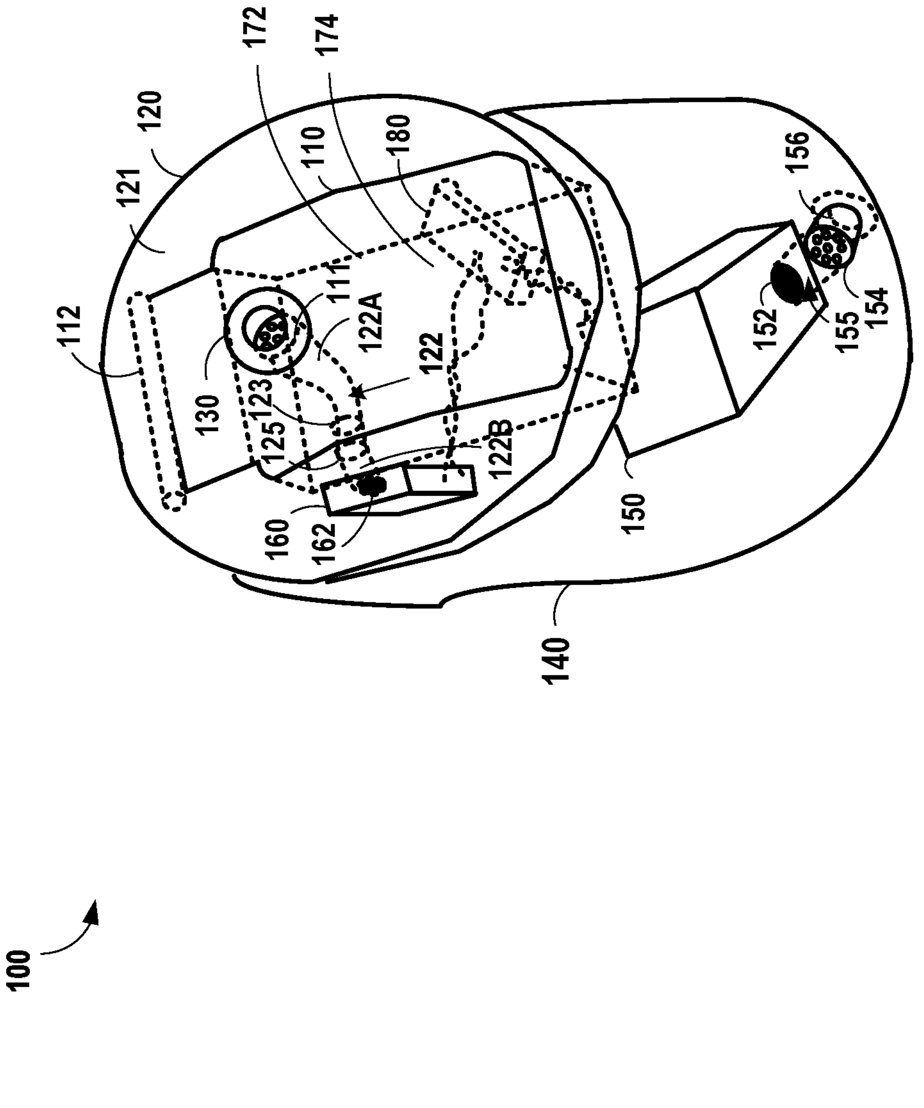
FIG. 1 is an illustration of an example of a hearing instrument, in accordance with one or more techniques of this disclosure.

Hearing instruments include electronic devices that assist a user in hearing sounds, such as sounds not perceptible by the user independently. Many sounds may not be perceptible to a user because of a user's diminished audio perception. Many people undergo diminished audio perception for a variety of reasons from natural aging to noise exposure. A user's diminished hearing sensitivity may be across all audible frequencies or at specific frequency bands. A hearing instrument may be configured to amplify sounds or shift sounds in frequency to overcome a user's diminished hearing sensitivity, amplifying sounds to a level the user may hear them or moving the sounds to frequencies the user is able to hear.

Hearing instruments may be configured to transduce audio sounds received by a microphone into electrical signals and process the electrical signals with electronics into processed electrical signals. The processed electrical signals may be transduced into audio signals and broadcast at the user's ear drum with a speaker (e.g., receiver). In some examples, the processing electronics may be configured to filter, amplify, or frequency-shift the electrical signals produced by a microphone that receives acoustic signals. The processed electrical signals may be sent to a speaker (e.g., receiver) that may be mechanically coupled to the housing of the hearing instrument.

Some hearing instruments may be considered "standard" or "custom." Standard hearing instruments may have a housing with a universal structure or form factor, wearable by a variety of users. Some standard hearing instruments may include a receiver-in-canal (RIC), or a behind-the-ear (BTE) hearing instrument. A RIC may be configured to sit on the top surface of the user's ear, proximate to the temple, connected to a wire harness that extends around the ear and into the ear canal, terminating in a speaker. The speaker may be configured to direct audio signals into the user's ear canal. A BTE may be configured to sit on a similar top surface of the user's ear near the user's temple, using a tube or audio channel to direct audio sounds produced by a speaker, integrated in the housing, toward the user's ear canal.

Custom hearing instruments, like BTEs, may have a speaker integrated within a housing. The housing of a custom hearing instrument, may be produced by one of forming, printing, or molding the housing to fit the unique contours of a portion of a wearer's ear canal. The housing may be at least partially disposed within a portion of the wearer's ear canal when operated. When operating, the hearing instrument may be configured to orient the speaker (e.g., receiver) closer to the ear drum of the user than a standard BTE. The housing of a custom hearing instrument may also be configured to prevent the ingress of foreign body material into the electronics of the hearing instrument, when worn on or in the ear.

In some examples, foreign material such as ear wax may fill a portion of microphone audio port or the audio channel, attenuating audio signals received by the microphone. Foreign material that substantially fills a portion of the microphone audio port or the audio channel may cause audio distortion or audio attenuation. In some instances, foreign material may change the audio characteristics of the audio channel resulting in unexpected audio filtering, not compensated for by the processing electronics. Centrally locating the microphone port or audio channel opening on the exterior surface of the housing may reduce the risk of foreign material ingress, increasing the spacing between the opening and the inner surface of the ear canal. However, centrally locating the microphone may conflict with centrally locating the battery to improve fitment among users. One or more techniques of this disclosure may describe a hearing instrument that may lessen the risk of audio attenuation due to the ingress of foreign material.

The hearing instrument may include a variety of components to implement the techniques of audio processing for the purpose of assisting the user in hearing sounds. The hearing instrument may include a microphone, processing electronics, a speaker, a battery, and a housing.

FIG. 1 is an illustration of an example of a hearing instrument 100, in accordance with one or more techniques of this disclosure. Hearing instrument 100 may include a shell 140 and a housing element 120, collectively referred to as a housing. A portion of housing element 120 may define an entrance 111 that serves as an entrance of battery cavity 172. Battery cavity 172 may be a cavity or other type of space within hearing instrument 100. For example, battery cavity 172 may be an interior space of hearing instrument 100 into a which a battery may be installed. Battery cavity 172 may have one or more sides that are defined by a door such as battery door 110 that covers a portion of a battery installed in battery cavity 172.

Hearing instrument 100 includes battery door opening 174. Battery door opening 174 may be an opening in a side of hearing instrument 100 that permits access to battery cavity 172. Battery door opening 174 may be formed as an opening to battery cavity 172 when battery door 110 is in an open state.

Hearing instrument 100 includes battery door 110. Battery door 110 may be a door or other type of moveable panel. Battery door 110 may be planar or include one or more nonplanar surfaces. In various examples, interior edge 121 of housing element 120, near battery door opening 174 (illustrated with battery door 110 in a closed state), may be configured to mechanically couple to an edge of battery door 110 with a hinge 112. Hinge 112 may be configured to allow battery door 110 to articulate with respect to housing element 120. In a closed state, battery door 110 may be oriented to be at least partially disposed within battery cavity 172. In an opened state, battery door 110 may be oriented to expose at least a portion of a battery, such as exposing a battery's terminals. Some examples allow for access and removal of the battery when battery door 110 is oriented in the open state.

In some examples, hearing instrument 100 may include a microphone 160 that is configured to receive audio signals presented to an audio port 162 of microphone 160 and transduce the audio signals into electrical signal representations. Audio port 162 of microphone 160 may be an opening in a microphone housing, allowing microphone 160 to receive audio signals sent to microphone 160. An audio channel 122 may direct audio signals to audio port 162 of microphone 160. Microphone 160 may transduce the audio signals into electrical signals that may be sent to processing electronics 180 via conductive traces, wires, or transmission lines.

Processing electronics 180 may include various processors configured to receive electrical signals produced by microphone 160. The processor(s) may be configured to perform various signal processing techniques on the electrical signals. Some techniques include filtering, mixing, amplifying, frequency shifting, and attenuating various portions of the electrical signal. In some examples, the signal may be digitized before applying one or more of the signal processing techniques. Digitizing the electrical signal may include sampling the electrical signal with one or more analog to digital converters (ADC), integrated in the processing electronics, resulting in the generation of a sequence of digital data. The digital data may be further manipulated with firmware implemented by one or more processors. The processed digital data may be converted into a processed electrical signal with a digital to analog converter (DAC), also integrated in the processing electronics.

Processing electronics 180 may include various other peripheral devices that may be configured to include additional hearing aid features such as wireless communication (e.g., Bluetooth, Near Field Communication, Wireless Fidelity, Orthogonal Frequency-Division Multiplexing, Code-Division Multiple Access, and other microwave communication methods), artificial intelligence processing (machine learning and neural networks) proximity detection, binaural processing, and other features utilizing wireless technology and advanced processing techniques. Hearing instrument 100 may use a common power supply to produced electrical energy for all hardware contained within the housing of hearing instrument 100 when simultaneously operating the processing electronics 180, a speaker 150, microphone 160, and other peripherally connected hardware.

Speaker 150 (e.g., receiver) may be used to receive the processed electrical signal from processing electronics 180 and transduce the electrical signal into an amplified audio signal directed at the ear of a user. Based on the processed electrical signal, speaker 150 transmits an acoustical wave represented by the processed electrical signal out of an audio port 152 of speaker 150. Audio port 152 of speaker 150 may be an opening in a speaker housing used to direct acoustical waves or sounds produced by speaker 150, towards the user's ear drum. Based on the type of hearing instrument and the orientation of hearing instrument 100, a distance between the user's eardrum and a speaker port of hearing instrument 100 may vary. A hearing instrument that is further disposed completely in the user's ear canal may have a shorter distance between the speaker port and the ear drum than a hearing instrument that is only partially disposed in the user's ear. The type of hearing instrument may also limit the size of speaker integrated into the device. Hearing instruments that may fit completely in the wearer's ear canal (e.g., IIC(s) and CIC(s)) may be limited to using speaker (e.g., receivers) with medium to small form factors. The size of the speaker and the amount of electrical power consumption by the speaker, may depend on the characteristics of the size of the speaker. A common power supply may be used to supply the electrical power demands of the speaker and the processing electronics.

In various examples, the common power supply is a single battery that may be used to supply power to all electrical hardware used by the hearing instrument. In some examples, the battery may be rechargeable or disposable. Whether the battery is rechargeable or disposable, the battery may be accessible or replaceable. Accessing the battery may allow a user to change the battery, clean the battery contacts, replace the battery, or charge the battery. In some examples, exposing the contacts of the hearing instrument's battery may occur when battery door 110 is configured in an open state. In some examples, hearing instrument 100 is non-operational when the battery terminals or contacts are exposed by opening battery door 110. When battery door 110 is open, hearing instrument 100 may be more susceptible foreign material ingress because the battery door exposes a battery cavity formed by a portion of the housing.

The housing may include of a variety of physical components such as a casing and battery door 110. The housing may be classified as custom or standard depending on the form factor of the casing. Standard hearing instruments may have housings which include casings, having a uniform form factor among themselves, wherein any one of the hearing instruments may be used by any of a variety of users. A custom housing may include a casing including a shell 140, having a unique form factor, and a housing element 120 (e.g., faceplate), uniquely cut from a standard form. Shell 140 and housing element 120 may collectively be referred to as the casing.

In some examples, shell 140 may be configured to be part of the housing for one of an invisible-in-canal (IIC), completely-in-canal (CIC), in-the-canal (ITC), or in-the-ear (ITE), custom hearing instrument. The housing of hearing instrument 100 may be part of a custom hearing aid that fits the unique contours of a user's ear or ear canal. In some examples, the housing may have a standardized shape that is not unique to an individual user's ear or ear canal. In some examples, shell 140 may be formed from curing epoxy, printable plastic, stereolithography or other molding or 3D printing techniques.

The casing and battery door may enclose electrical hardware of hearing instrument 100. The casing, including shell 140 and housing element 120, may be assembled from two separate pieces mechanically coupled together with epoxy or other curable resin. In some examples, the material of shell 140 and housing element 120 may include at least on shared material. In some examples the materials used in the shell 140 and housing element 120 may include distinctly different materials. Materials used to make shell 140 or element 120 may include a polymer of one of nylon, acrylic, glass (e.g., embedded structural fibers), synthetic rubber, or some combination of plastic or glass. In some examples, shell 140 may be coupled to housing element 120 with various adhesives or curing plastics. When coupled together, shell 140 and housing element 120 may be configured to allow at least a portion of shell 140 to be disposed within the ear, concha, or ear canal of the user. When situated in the ear, concha, or canal, housing element 120 may form an end of the housing closest to an opening out of the ear and away from the body. When similarly situated in the ear, shell 140 forms an end of the hearing instrument positioned closest to the ear drum. For purposes of this disclosure the surface of the housing element facing out of the ear is defined as the proximal external surface. The surface of the shell arranged to face toward the ear drum is defined as the distal surface external surface.

To provide access to a battery while limiting contact between the battery access port and the ear, a portion of the housing element may be configured as battery door 110. Battery door 110 may include a rotational portion, configured to actuate about a pivot joint 112. Battery door 110 may be configured to be detachable from a second portion of the housing (e.g., casing) surrounding the battery door. Battery door 110 may include a structural component configured to hold a battery. When battery door 110 is configured in the closed state, the battery may be surrounded by the casing and battery door 110. When battery door 110 is closed, acoustic sounds coming into the ear may be received by audio port 162 on microphone 160. However, microphone 160 is typically oriented with the audio port of microphone 160 directionally positioned out of the ear while maintaining separation between the audio port and the inner surface of the ear. The separation inhibits the ingress of ear wax and foreign material into microphone 160 through the microphone port. While orienting microphone port 162 at the center of the outer surface of the housing element 120 (e.g., faceplate) is preferred, such an arrangement is challenged by the arrangement and orientation of the battery and battery door 110.

In some examples, the battery and battery door 110 may be arranged central to housing element 120 to limit the risk of mechanical interference between the shell and the battery. Centrally locating the battery cavity, and there for battery door 110, on housing element 120 may provide more space for a battery than if the battery were located near the periphery of hearing instrument 100. Locating the battery near the center of housing element 120 may limit available location for the placement of the microphone. Centrally locating both microphone 160 and the battery pose a challenge in the space restrictions of the hearing instruments, especially custom hearing instruments. However, microphone 160 may still receive audio signals directed at the center of the outer surface of housing element 120 by using audio port (e.g., entrance 111) of audio channel 122 centrally located on battery door 110. Using a centrally located audio port may allow for improved audio performance and improved foreign material ingress protection.

Using one or more techniques of this disclose, hearing instrument 100 may overcome the challenges of centrally locating both microphone 160 and battery door 110 within housing element 120. Using integrated audio channel 122 to direct audio signals received at a point central to battery door 110 to microphone 160, may allow microphone 160 to be peripherally located in relation to housing element 110. Microphone 160 may be oriented proximal to battery door 110 but not centrally located in relation to housing element 120. Audio channel 122 may be configured to receive audio signals from entrance 111, centrally located in relation to housing element 120. Audio channel 122 may be meandered to a noncentrally located position where microphone 160 is oriented.

In some examples, the housing of hearing instrument 100 may include audio channel 122 that extends from the proximal external surface of battery door 110 through the housing to microphone 160. Audio channel 122 may be convoluted, twisted, looped, or meandered in an indirect path, inhibiting the ingress of foreign material. Battery door 110 may define entrance 111, being a first entrance into a first portion 112 of an audio channel. Audio channel 122 may include first portion 122A and second portion 122B, terminating at audio port 162 of microphone 160. The convoluted path may direct audio signals received at a central location of battery door 110, through audio channel 122 to microphone 160. By using a convoluted path with a first entrance near the center of battery door 110 may improve audio performance while mitigating the risk of audio attenuation due to foreign material.

In some examples, audio channel 122 includes a first portion 122A and a second portion 122B. First portion 122A of audio channel 122, may be a tunnel, sleeve, opening, passage, or other void defined by a portion of battery door 110, surrounding the void. First portion 122A may be configured to receive audio signals through an entrance 111 on an exterior surface of battery door 110 (e.g., a side of battery door 110 that disposed opposite that of battery cavity 174). Entrance 111 may be a first entrance of audio channel 122. First portion 122A of audio channel 122 may have a first exit 123 on an internal surface of battery door 110. The first exit 123 may align with a second entrance 125 of second portion 122B of audio channel 122. Second portion 122B of audio channel 122 may extend from second entrance 125 through housing element 120, terminating in the cavity containing microphone 160.

In some examples, a filter basket 130 may be partially disposed in entrance 111. Filter basket 130 may be configured to inhibit the ingress of foreign material into audio channel 122. In some examples, a speaker 150 (e.g., a receiver) may be positioned on a distal end of hearing instrument 100 and may be oriented to generate audio based on an electrical signal received from audio processing circuitry 180. Audio processing circuitry 180 may process the electrical signals generated by microphone 160, which represent audio signals received by microphone 160, into processed electrical signals. The processed electrical signals may be the result of amplifying, frequency shifting, or otherwise modifying the electrical signals produced by microphone 160.

In some examples, battery door 110 may be connected to housing element 120 via pivot joint 112. Pivot joint 112 may include a hinge, a pin, hooks, or other mechanism that allows battery door 110 to swing, rotate, or actuate with respect to housing element 120. Battery door 110 may define a first portion 122A of audio channel 122. First portion 122A of audio channel 122 may include opening 111 on an exterior surface of battery door 110 and first portion 122A of audio channel 122 may have a first exit 123 on an internal surface of battery door 110. The internal surface of battery door 110 may be a surface of battery cavity 172. In addition, battery door 110 may be at least partially disposed within housing element 120 when in a closed state (e.g., battery door 110 may be partially recessed into hearing instrument 100). First portion 122A may be configured to direct acoustic sounds received at first entrance 111 through first portion 122A into second portion 122B via first exit 123.

In some examples, housing element 120 may define second portion 122B of audio channel 122. Second portion 122B of audio channel 122 may have a second entrance 125 aligned with first exit 123. Second portion 122B of audio channel 122 may terminate in the cavity containing microphone 160. Second portion 122B may be configured to receive audio sounds or acoustic signals from first exit 123 of first portion 122A and direct the sounds or signals through second portion 122B. The acoustic sounds or signals may be directed into audio port 162 of microphone 160.

Filter basket 130 may be positioned within first entrance 111 in battery door 110. In some examples, filter basket 130 and/or filter basket 154 may include a mesh configured to pass audio signals but inhibit the passage of foreign materials. The mesh may be made of a web which includes at least one polymer. The polymer may be nylon, acrylic, or another plastic compatible with medical devices. The web may include crisscross fibers defining small openings into the audio channel. The small openings may be configured to pass a significant portion of audio signals with little attenuation or reflection. The size of the openings may also be configured to inhibit the passage of foreign material such as ear wax, skin tissue, or other material commonly found in the ear canal.

In some examples, filter basket 130 may be a first filter basket configured to prevent blockage of a first audio channel microphone audio channel. A second filter basket 154 may be positioned proximate to speaker 150, oriented to prevent foreign material from entering a second audio channel 155 extending from audio port 152 of speaker 150 to the distal external surface of the hearing instrument. Second audio channel 155 may be configured to guide sound generated by speaker 150 (e.g., receiver) out of hearing instrument 100. Second filter basket 154 may be partially disposed within an exit 156 of the second audio channel. In some examples the first and second filter baskets may be the same size, shape, and material composition.

Figure 2:
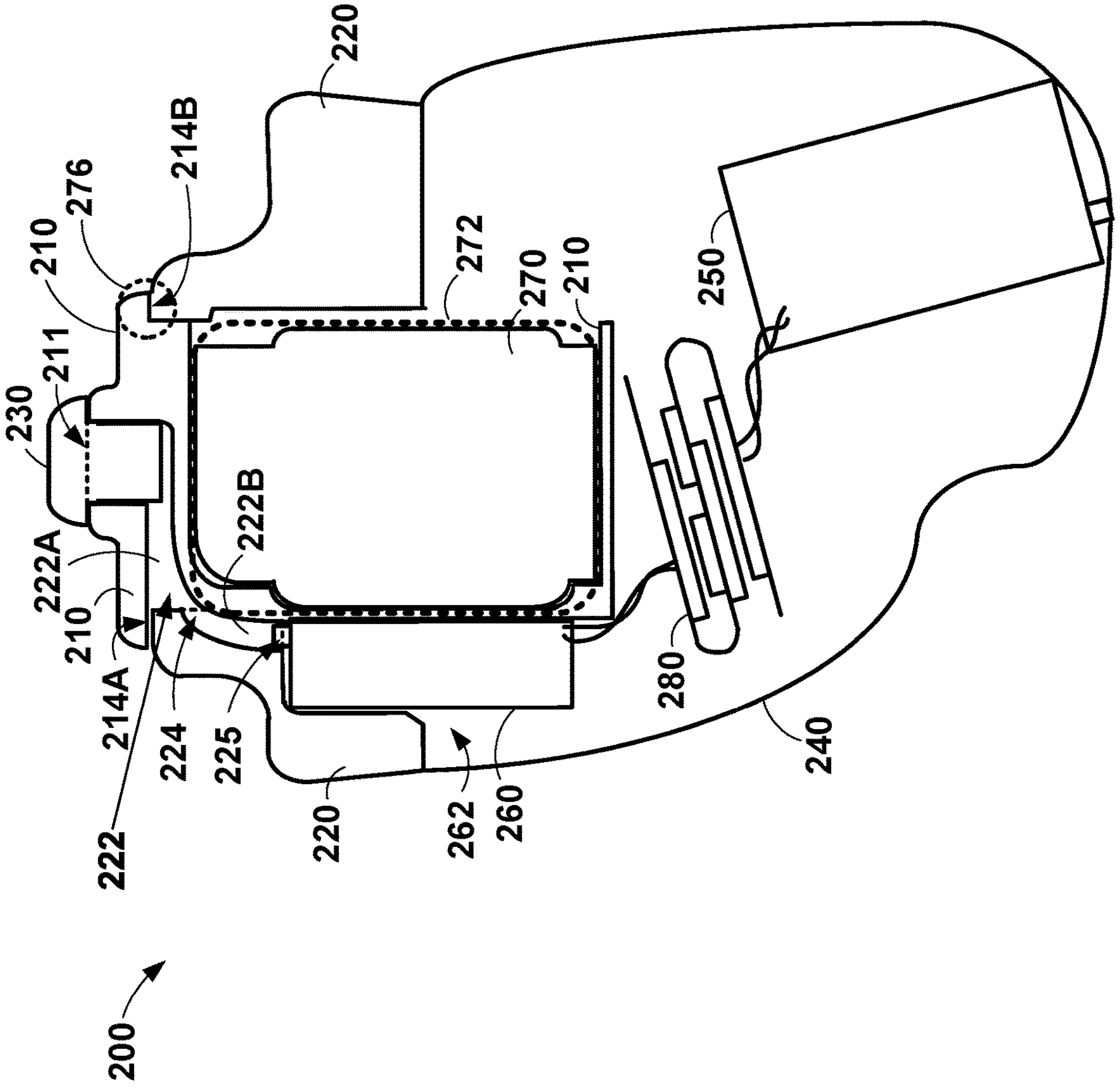
FIG. 2 is an illustration depicting a sectional view of a hearing instrument with an audio channel disposed within a housing, in accordance with one or more techniques of this disclosure.

FIG. 2 is an illustration depicting a sectional view of a hearing instrument 200 with an audio channel disposed within a housing, in accordance with one or more techniques of this disclosure. Hearing instrument 200 may include a housing including a housing element 220. Housing element 220 may be similar to housing element 120 of FIG. 1. Hearing instrument 200 may include a battery door 210 which may be similar to battery door 210 as illustrated in FIG. 1 and a shell 240 which may be similar to shell 140 as illustrated in FIG. 1. Shell 240 may be mechanically coupled to housing element 220 via epoxy, adhesive, curing polymer, or other curing material that will hold an outer end of shell 240 to housing element 220. Battery door 210 may be configured to actuate along a pivot joint connecting battery door 210 to housing element 220. Housing element 220 may have a battery cavity defined by an inner wall of housing element 220, configured to receive battery 270, when battery door 210 is in the closed state.

The housing of hearing instrument 200 may include battery door 210, housing element 220 and shell 240. The housing may be configured to enclose electronic components such as processing circuitry 280, battery 270, microphone 260, speaker 250, and electrical interconnections. Hearing instrument 200 may be configured to use processing electronics 280 to perform audio processing functions on audio signals received by microphone 260. Audio signals received by microphone 260 may be converted into electrical signals and sent to processing circuitry 280. Processing circuitry 280 may process the electrical signals with at least one technique of the techniques including filtering, amplifying, frequency shifting, or modulating, into a processed electrical signal. The processed electrical signal may be sent to speaker 250 (e.g., receiver). Speaker 250 may convert the processed electrical signal into an audio signal and direct the audio signal at the user's ear drum.

In some examples, speaker 250 may be oriented in a distal end of hearing instrument 200. Speaker 250 may be electrically connected to processing circuitry 280 and further connected to microphone 260 and battery 270. In some examples, the electrical connections may be made with electrical interconnections including at least one of wires, flexible circuit boards, rigid circuit boards, conductive braided fiber, or other electrical harness materials. Electrical terminals such as contacts, clips, or other conductive holding features (e.g., battery terminals, connection pads) may also be integrated into the electrical connections.

In some examples, hearing instrument 200 may be configured to operate when battery 270 is inserted into battery cavity 272 via battery cradle of battery door 210, and battery door 210 is configured in the closed state. In some examples, battery door 210 may include a battery cradle that holds battery 270 and positions battery 270 to contact one or more battery contacts for hearing instrument 200 when battery door 210 is in the closed state. Battery 270 may contact battery contacts of hearing instrument 200 when battery door 210 is maneuvered into the closed state. Battery 270 may send electrical power to processing circuitry 280, microphone 260 and speaker 250.

Hearing instrument 200 includes battery cavity 272. Battery cavity 272 may be similar to battery cavity 172 as illustrated in FIG. 1. Battery cavity 272 may be cavity or space within hearing instrument 200 that may be partially or fully occupied by battery 270 when battery 270 is inserted in hearing instrument 200 and battery door 210 is closed. In some examples, contiguous audio channel 222 may be formed when battery door 210 is closed.

Audio channel 222 may be defined by the inner wall of several sections of the housing, forming various portions of audio channel 222. In some examples, a first portion 222A of audio channel 222 and a second portion 222B of audio channel 222 may meander from an outer surface of battery door 210 of hearing instrument 200 to a cavity 262 holding microphone 260. Audio channel 222 may be configured to transduce audio signals from a first entrance 211 of first portion 222A, through first portion 222A, into a second entrance 224 of second portion 222B, through second portion 222B, into an audio port of microphone 260. Microphone 260 may be configured to fit into a microphone pocket, or cavity 262, having an opening between the audio port of microphone 260 and a second exit 225 of second portion 222B.

In some examples, first entrance 211 of first portion 222A may be centrally positioned on an outer surface of battery door 210. Centrally positioned may be on near a medial line across the proximal exterior surface of battery door 210. In some examples, centrally positioned may mean located approximately equal distance from all exterior surface edges of battery door 210. An exit of first portion 222A may align with second entrance 224 into second portion 222B at a junction point. The junction may be defined as a seam between lateral surfaces of battery door 210 and housing element 220. A first junction may divide audio channel 222 into first portion 222A and second portion 222B. In some examples, audio signal may propagate from first entrance 211 of first portion 222A to second exit 225 of second portion 222B when battery door 210 is configured in the closed state.

In some examples, a filter basket 230 may be configured to be partially disposed within first portion 222A. Filter basket 230 may be configured to pass audio signal through a mesh surface but inhibit the passage of foreign material (e.g., ear wax, hair, or skin tissue). In some examples, filter basket 230 may be removable from the first entrance 211 of first portion 222A portion of a lateral surface, by sliding, twisting, pulling, or use of other mechanical means of releasing a mechanical coupling between filter basket 230 and first entrance 211 of first portion 222A.

Battery door 210 may extend beyond an opening of battery cavity 272 and overlap a portion of housing element 220. Battery door 210 may overlap a portion of housing element 220 as lateral edge 276 (indicated by the dotted circle in FIG. 2). Battery door 210 may include lateral edge 276 as a portion of battery door 210 that extends beyond an opening of battery cavity 272 (e.g., a side of battery cavity 272 that corresponds to battery door 210) and overlaps at least a portion of housing element 220. For example, battery door 210 may extend beyond an opening of battery cavity 272 to overlap a portion of housing element 220 near second lap joint 214B. The portion of battery door 210 that overlaps housing element 220 may be proximate to audio channel 222 forming a first lap joint 214A. In some examples a second lap joint 214B may be formed on the opposite side of filter basket 230 from first lab joint 214A. First lap joint 214A and second lap joint 214B (collectively "lap joints 214") may be configured to mechanically stop battery door 210 from articulating past the closed state. Lap joints 214 may also facilitate hearing instrument 200 in inhibiting the ingress of foreign material into the battery cavity or audio channel 222.

Figure 3:
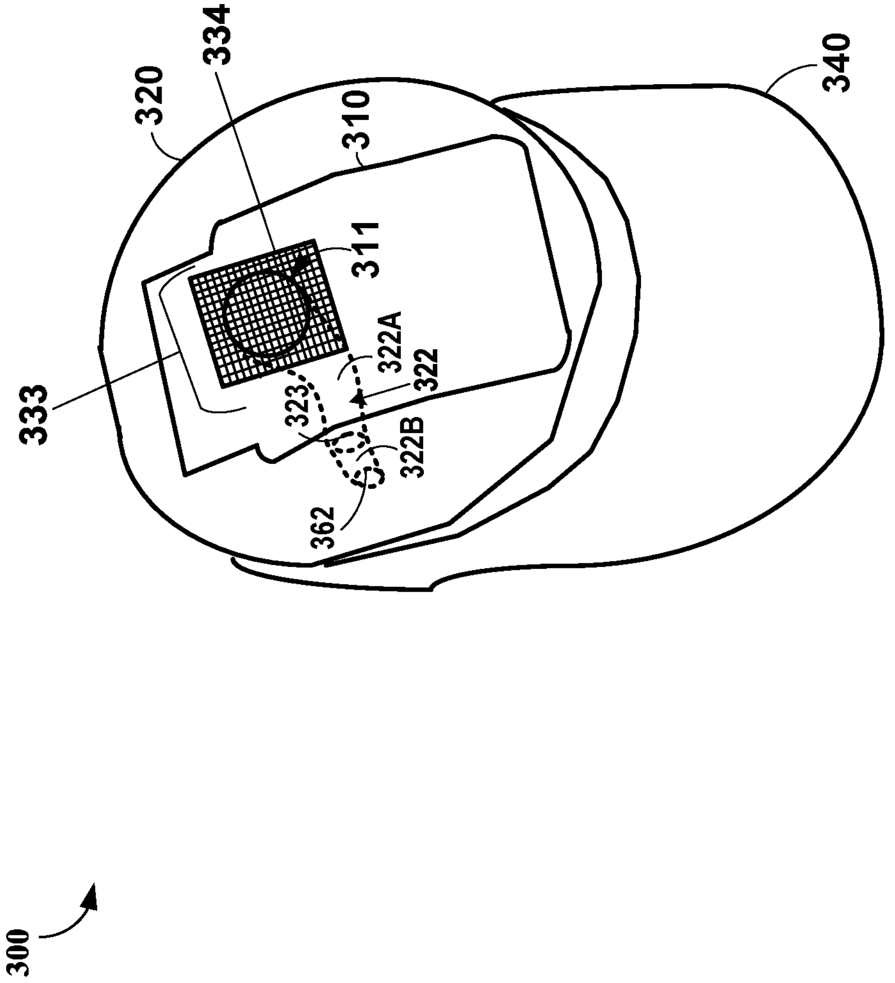
FIG. 3 is an illustration of an example of a hearing instrument housing having an audio filter mesh, in accordance with one or more techniques of this disclosure.

FIG. 3 is an illustration of an example of a hearing instrument housing 300 having an filter mesh 333, in accordance with one or more techniques of this disclosure. Hearing instrument housing 300 may be an example of the housing of hearing instrument 100 illustrated in FIG. 1 or hearing instrument 200 illustrated in FIG. 2. Hearing instrument housing 300 may include a battery door 310, a housing element 320, and a shell 340. Hearing instrument housing 300 may be configured to surround electrical components of the hearing instrument, such as hearing instrument 100 and 200 of FIG. 1 and FIG. 2 respectively. Hearing instrument housing 300 may be configured to inhibit the ingress of foreign material into a first portion 322A of audio channel, a second portion 322A of audio channel (collectively "audio channel 322"), or a battery cavity defined by housing element 320. Audio channel 322 may be an example of audio channel 122 of FIG. 1 or audio channel 222 of FIG. 2. First portion of audio channel 322A may be defined by an inner wall surface of a battery door 310 whereas second portion of audio channel 322B may be defined by an inner wall surface of housing element 320.

Audio channel 322 may be configured to be a continuous channel, tube, tunnel, or other finite space surrounded by a physical structural element, when battery door 310 is oriented in the closed state. When battery door 310 is oriented in the open state first portion 322A may become a separate cavity from second portion 322B. In the closed state, battery door 310 may be at least partially disposed within a housing element 320 allowing audio channel 322 to direct audio, sounds, or acoustic waves received at a first entrance 311 to second exit 362 of second portion 322B. Some electrical components may include microphone 160 and 260, battery 170 and 270, speaker 150 and 250, processing electronics 180 and 280 of FIG. 1 and FIG. 2 respectively. The housing may be configured to inhibit foreign materials from contacting electrical components of hearing instrument 300.

In some examples, a filter mesh 333 may be used to serve a similar function to filter basket 130 of FIG. 1 or filter basket 230 of FIG. 2. Filter mesh 333 may at least partially cover first entrance 311 of first portion 322A of audio channel 322. Filter mesh 333 may include filaments arranged in a formation defining periodic voids, holes, or openings. These periodic holes may be of a size to allow limited attenuation of audio signals while still significantly inhibiting the ingress or passage of foreign material such as ear wax, hair, or other human tissue into first portion 322A. Filter mesh 333 may be affixed to a proximal exterior surface of battery door 310 covering first entrance 311 of first portion 322A of an audio channel 322. In some examples, filter mesh 333 may be integrated into battery door 310, forming one contiguous piece with battery door 310. Filter mesh 333 may include at least one polymer of the polymer materials plastic, glass, nylon, acrylic, or other medically compatible polymer material.

In some examples, filter mesh 333 may be cut into a polygon of similar shape to first entrance 311 of first portion 322A of audio channel 322. While FIG. 3 illustrates first entrance 311 as a circular opening, first entrance 311 may be an opening of any shape including any polygonal shape. In some examples, filter mesh 333 may be cut to similar size and shape as first entrance 311. In some examples, filter mesh may be rectangular, elliptical, or any other polygonal shape (e.g., hexagonal, octagonal, etc.). In some examples, filter mesh 333 may be a replaceable part that may be affixed to battery door 310. In some examples, a shallow indent in the outer surface of the battery door 310, with a depth equal to the thickness of filter mesh 333 may be used to maintain a flush exterior proximal surface along battery door 310.

Filter mesh 333 include a layer of battery door 310 as replaceable mesh layer 334. Filter mesh 333, when installed or otherwise affixed to battery door 310, may form the layer of a portion of battery door 310 as replaceable mesh layer 334. For example, replaceable mesh layer 334 may be a layer of battery door 310 over first entrance 311 that is flush with a surface of battery door 310 and allows for the passage of audio signals but inhibits the passage of foreign materials through the mesh of replaceable mesh layer 334. Replaceable mesh layer 334 may lay flush with a portion of an exterior face or side of battery door 310 that does not overlap housing element 320. In an example, replaceable mesh layer 334 lies flush with a non-overlapping portion of battery door 310 (e.g., a portion of battery door 310 that does not overlap housing element 320 when battery door 310 is closed) and allows for the passage of audio signals though filter mesh 333.

Replaceable mesh layer 334 may additionally be replaceable by a user or technician. For example, replaceable mesh layer 334 may be part of a replaceable mesh layer that covers first entrance 311. In another example, replaceable mesh layer 334 is held in place against battery door 310 using one or more types of attachment mechanisms such as snaps that enable a user or technician to easily remove and replace replaceable mesh layer 334 (e.g., when the mesh of replaceable mesh layer 334 becomes clogged with foreign materials).

Example 1. A hearing instrument comprising: a microphone; and a housing that defines a cavity containing the microphone, the housing comprising: a battery door defining a first portion of an audio channel, the first portion of the audio channel having a first entrance on an exterior surface of the battery door, the first portion of the audio channel having a first exit on an internal surface of the battery door; and a housing element defining a second portion of the audio channel, the second portion of the audio channel having a second entrance aligned with the first exit, the second portion of the audio channel terminating in the cavity containing the microphone.

Example 2. The hearing instrument of example 1, further comprising a filter basket partially disposed within the first entrance of the audio channel, wherein the filter basket comprises a mesh configured to pass audio signals but inhibit the passage of foreign materials.

Example 3. The hearing instrument of either example 1 or 2, wherein: the filter basket is a first filter basket, the audio channel is a first audio channel, the hearing instrument further comprises a receiver and a second filter basket, the housing defines a second audio channel configured to guide sound generated by the receiver out of the hearing instrument, the second filter basket being partially disposed within an exit of the second audio channel, the first and second filter baskets having a same size, shape, and material composition.

Example 4. The hearing instrument of any of examples 1-3, wherein the battery door further comprises a portion of a lateral edge of the exterior surface of the battery door, extending beyond an opening of the battery door cavity and overlapping a portion of the housing element.

Example 5. The hearing instrument of any of examples 1-4, wherein the housing element further defines a battery door opening of a battery door cavity, wherein an interior edge of the housing element is configured to couple to the battery door with a hinge, wherein the hinge is configured to articulate the battery door with respect to the housing element.

Example 6. The hearing instrument of example 5, wherein the first portion of the audio channel and the second portion of the audio channel form a continuous channel when the battery door is in a closed state, wherein when the battery door is in the closed state, the battery door is disposed at least partially within the battery door opening.

Example 7. The hearing instrument of any of examples 1-6, wherein the hearing instrument is a custom hearing aid of at least one of an invisible in canal (IIC), an in the canal (ITC), and an in the ear (ITE).

Example 8. The hearing instrument of any of examples 1-7, wherein the first entrance of the audio channel is centrally positioned on the exterior surface of the battery door.

Example 9. The hearing instrument of any of examples 1-8, further comprising a replaceable mesh layer covering the first entrance of the audio channel, wherein the exterior surface of the battery door is configured to couple to the replaceable mesh, wherein the replaceable mesh lies flush with a non-overlapping portion of the exterior surface of the battery door, wherein the replaceable mesh layer is configured to pass audio signals but inhibit the passage of foreign materials.

What is claimed is:

1. A hearing instrument comprising:

a microphone; and a housing that defines a cavity containing the microphone, the housing comprising:

a battery door defining a first portion of an audio channel, the first portion of the audio channel having a first entrance on an exterior surface of the battery door, the first portion of the audio channel having a first exit on an internal surface of the battery door; and a housing element defining a second portion of the audio channel, the second portion of the audio channel having a second entrance aligned with the first exit, the second portion of the audio channel terminating in the cavity containing the microphone.

2. The hearing instrument of claim 1, further comprising a filter basket partially disposed within the first entrance of the audio channel, wherein the filter basket comprises a mesh configured to pass audio signals but inhibit passage of foreign materials.

3. The hearing instrument of claim 2, wherein:

the filter basket is a first filter basket, the audio channel is a first audio channel, the hearing instrument further comprises a receiver and a second filter basket, the housing defines a second audio channel configured to guide sound generated by the receiver out of the hearing instrument, the second filter basket being partially disposed within an exit of the second audio channel, the first and second filter baskets having a same size, shape, and material composition.

4. The hearing instrument of claim 1, wherein the battery door further comprises a portion of a lateral edge of the exterior surface of the battery door, extending beyond an opening of a battery cavity and overlapping a portion of the housing element.

5. The hearing instrument of claim 1, wherein the housing element further defines a battery door opening of a battery cavity, wherein an interior edge of the housing element is configured to couple to the battery door with a hinge, wherein the hinge is configured to articulate the battery door with respect to the housing element.

6. The hearing instrument of claim 5, wherein the first portion of the audio channel and the second portion of the audio channel form a continuous channel when the battery door is in a closed state, wherein when the battery door is in the closed state, the battery door is disposed at least partially within the battery door opening.

7. The hearing instrument of claim 1, wherein the hearing instrument is a custom hearing aid of at least one of an invisible in canal (IIC) hearing aid, an in the canal (ITC) hearing aid, or an in the ear (ITE) hearing aid.

8. The hearing instrument of claim 1, wherein the first entrance of the audio channel is centrally positioned on the exterior surface of the battery door.

9. The hearing instrument of claim 1, further comprising a replaceable mesh layer covering the first entrance of the audio channel, wherein the exterior surface of the battery door is configured to couple to the replaceable mesh layer, wherein the replaceable mesh layer lies flush with a non-overlapping portion of the exterior surface of the battery door, wherein the replaceable mesh layer is configured to pass audio signals but inhibit passage of foreign materials.

* * * * *